(12) United States Patent
Yano et al.

(10) Patent No.: US 7,153,566 B2
(45) Date of Patent: Dec. 26, 2006

(54) POROUS FILM AND PROCESS FOR PRODUCING THE SAME

(75) Inventors: Shigeru Yano, Aichi (JP); Mindiaw Wang, Aichi (JP); Taroh Ichikawa, Aichi (JP)

(73) Assignee: Mitsui Chemicals, Inc., Tokyo (JP)

( * ) Notice: Subject to any disclaimer, the term of this patent is extended or adjusted under 35 U.S.C. 154(b) by 693 days.

(21) Appl. No.: 09/913,725

(22) PCT Filed: Dec. 18, 2000

(86) PCT No.: PCT/JP00/08954

§ 371 (c)(1),
(2), (4) Date: Aug. 17, 2001

(87) PCT Pub. No.: WO01/46302

PCT Pub. Date: Jun. 28, 2001

(65) Prior Publication Data

US 2002/0192455 A1  Dec. 19, 2002

(30) Foreign Application Priority Data

Dec. 22, 1999  (JP) ................................. 11-363790

(51) Int. Cl.
*B32B 5/22* (2006.01)
(52) U.S. Cl. ............................ 428/317.9; 428/315.7; 521/908; 521/50; 524/515
(58) Field of Classification Search ............. 428/317.9, 428/315.7; 521/134, 82, 92, 93, 142
See application file for complete search history.

(56) References Cited

U.S. PATENT DOCUMENTS 4,793,956 A    12/1988  Nogiwa et al.
4,794,128 A *  12/1988  Kawaguchi et al. ......... 521/138
5,015,521 A *   5/1991  Fujii et al. .................. 428/220
5,656,582 A *   8/1997  Shiraishi et al. ............ 508/100
5,861,211 A *   1/1999  Thakkar et al. .......... 156/273.3
5,945,210 A *   8/1999  Senba et al. ................ 264/211
6,284,828 B1*  9/2001  Takayama ................... 524/413

FOREIGN PATENT DOCUMENTS

| JP | 62-015090 | 4/1987 |
| JP | 62-280233 | 12/1987 |
| JP | 05-035734 | 5/1993 |
| JP | 06-099581 | 12/1994 |
| JP | 11-158305 | 6/1999 |

OTHER PUBLICATIONS

Translation of JP-11-158305, Shigeru et al, Jun. 15, 1999, 10 pages.*
U.S. Appl. No. 09/772,854, Yano et al, Aug. 30, 2001.*

* cited by examiner

*Primary Examiner*—Hai Vo
(74) *Attorney, Agent, or Firm*—Buchanan Ingersoll & Rooney PC

(57) ABSTRACT

A porous film having excellent moisture permeability, flexibility and exudation resistance, as well as a manufacturing method capable of forming and stretching at high speed a porous film having the characteristics described above, the porous film being molded from a composition containing 25 to 55% by weight of polyolefinic resin and 75 to 45% by weight of an inorganic filler in which the polyolefinic resin contains 98 to 70% by weight of linear low density polyethylene and 2 to 30% by weight of branched low density polyethylene, and 0.5 to 5 parts by weight of liquid ethylene-α-olefin oligomer based on 100 parts by weight of the composition.

7 Claims, No Drawings

POROUS FILM AND PROCESS FOR PRODUCING THE SAME

BACKGROUND OF THE INVENTION

1. Field of the Invention

This invention concerns a porous film and a method of manufacturing the same. More specifically, it relates to a porous film having excellent moisture permeability, flexibility and exudation resistance. Further, it relates to a manufacturing method capable of forming and stretching the porous film having the characteristics described above at a high speed.

2. Statement of Related Art

Various methods of manufacturing porous films by stretching at least in one direction films formed by adding inorganic fillers and various kinds of oils and waxes to polyolefin resins and causing voids due to interface peeling between the inorganic filler and the polyolefin have been proposed so far. Since the porous films obtained by the methods have many minute voids at the inside, they do not allow liquids to permeate therethrough while having high moisture permeability. Utilizing the above-mentioned property, they have been used in a wide range including sanitary materials such as disposable paper diapers, building materials such as water proof sheets, reflection films and electric cell separators.

However, such films containing a great amount of inorganic fillers involve a drawback upon preparation and stretching in that film formation and stretching at high speed are difficult. That is, incorporation of the inorganic filler worsens draw down, to cause breakage and fracture of films, pinholes upon high speed film formation and stretching to hinder the improvement of the productivity. This trend is remarkable when the thickness of the film is reduced and it has been difficult to produce uniform films by film formation and stretching at high speed. Further, when the porous films are used as the material for the disposable diapers, it has been demanded for the performance of not permeating urine or the like but allowing only the moisture to permeate therethrough. Depending on the water absorptive polymers used in the disposable diapers, a slight amount of surface active agents may leach in the absorbed urine. In such a case, urine tends to be oozed from the porous film.

Among the problems described above, Japanese Patent Publication No. 35734/1993 proposes a method of adding castor oil as third ingredient to resin composition comprising polyolefin resin and inorganic filler for improving the uniformness of thickness and stretching/molding property at high speed. However, although the uniform thickness and the stretching/moldability at high speed can be improved to some extent according to this method, it still leaves a problem in view of the exudation from the film. Further, Japanese Patent Publication No. 99581/1994 proposes a porous film containing a mixture of hydrocarbon polymer and polyester as third ingredient. However, although the proposed porous film has favorable uniform thickness and flexibility, it involves a problems in the exudation resistance of the film. Furthermore, Japanese Patent Publication No. 15090/1987 proposes a porous film containing liquid or wax hydrocarbon polymer as third ingredient. However, although this porous film is improved for the exudation resistance, it still involves a problem in the uniformness of thickness and the flexibility.

SUMMARY OF THE INVENTION

An object of this invention, in view of the foregoing problems, is to provide a porous film having excellent moisture permeability, flexibility and exudation resistance, as well as provide a manufacturing method capable of high speed film formation and stretching of the porous film having the characteristics described above.

As a result of earnest studies, the present inventors have found that the foregoing subject can be overcome, upon preparing a porous film by stretching a film molded from composition containing from 25 to 55% by weight of polyolefinic resin and from 75 to 45% by weight of inorganic filler at least in a machine direction, by using resin containing 98 to 70% by weight of linear low density polyethylene and 2 to 30% by weight of branched low density polyethylene as the polyolefinic resin and adding 0.5 to 5 parts by weight of liquid ethylene-α-olefin oligomer based on 100 parts by weight of the composition and have achieved the present invention.

That is, this invention provides a porous film molded from composition containing 25 to 55% by weight of polyolefinic resin and 75 to 45% by weight of inorganic filler, in which the polyolefinic resin comprises 98 to 70% by weight of linear low density polyethylene and 2 to 30% by weight of branched low density polyethylene, and contains 0.5 to 5 parts by weight of liquid ethylene-α-olefin oligomer based on 100 parts by weight of the composition.

In this invention, the kinetic viscosity at 40° C. of the ethylene-α-olefin oligomer is preferably from 50 to 100,000 $mm^2$/sec. Further, as preferred characteristics of the porous film according to this invention, there can be mentioned that;

(1) permeability of the porous film is from 1500 to 4000 $g/m^2 \cdot 24$ hr, (2) the uniformness of thickness of the porous film is 0.15 or less, (3) the ratio ($S_T/T_H$) of the rigidity ($S_T$:mm) relative to the thickness of the porous film ($T_H$:μm) is from 1.3 to 2.2, (4) the ratio ($T_S/T_H$) of the exudation start time ($T_S$:min) relative to the thickness of the porous film ($T_H$:μm) is at least 0.2, the ratio ($T_E/T_H$) of the exudation end time ($T_E$:min) relative to the thickness ($T_H$:μm) is at least 0.4 and (5) the thickness of the porous film is 10 to 300 μm, respectively.

Another invention relates to a method of manufacturing porous film according to this invention described above, which is a method of manufacturing a porous film of molding a film from composition comprising 25 to 55% by weight of polyolefinic resin and 75 to 45% by weight of inorganic filler and stretching the thus obtained film at least in the machine direction, which comprises using resin containing 98 to 70% by weight of linear low density polyethylene and 2 to 30% by weight of branched low density polyethylene as the polyolefinic resin adding, 0.5 to 5 parts by weight of liquid ethylene-α-olefin oligomer based on 100 parts by weight of the composition and taking up the film while stretching the same at least at the line speed of 100 m/min upon stretching in the machine direction.

In the manufacturing method described above, the stretching factor at least in the machine direction is preferably at least 1.2 times.

The porous film according to this invention has excellent moisture permeability, flexibility and exudation resistance. Further, according to the method of manufacturing the porous film of this invention, the porous film having the characteristics described above can be manufactured at good productivity by taking up the porous film having the characteristics described above at high speed at least of 100 m/min. Accordingly, the porous film of this invention is extremely useful as the materials such as sanitary materials for disposable paper diapers, building materials for water proof sheets, reflection films and electric cell separators (materials for).

The exudation start time and exudation end time of the porous film in this invention means values measured by the methods described in the below specified examples.

DESCRIPTION OF PREFERRED EMBODIMENTS

This invention is to be explained in details. The porous film according to this invention is manufactured by adding inorganic filler and a liquid ethylene-α-olefin oligomer each in the specified amount to polyolefinic resin to form resin composition, molding the resin composition into a film and stretching the thus obtained film at least in the machine direction.

The polyolefinic resin used in this invention is the resin containing 98 to 70% by weight of linear low density polyethylene and 2 to 30% by weight of branched low density polyethylene. As the linear low density polyethylene, those having density of from 0.910 to 0.940 g/cm$^3$ and melt index of from 0.1 to 20.0 g/cm$^3$ are used. As the branched low density polyethylene, those having density of from 0.910 to 0.940 g/cm$^3$ and melt index of from 0.1 to 20.0 g/cm$^3$ are used. If the content of the branched low density polyethylene is less than 2% by weight, the uniformness of film thickness is worsened. Further, if the branched low density polyethylene exceed 30% by weight, stable high speed film formation becomes difficult.

In the polyolefinic resin used in this invention, other polyolefinic resins such as low density polyethylene, high density polyethylene, polypropylene, linear low density polyethylene and branched low density polyethylene out of the scope of the range in view of the density and the melt index may be mixed with the linear low density polyethylene and the branched low density polyethylene within a range not deteriorating the purpose of this invention. The mixing ratio of other polyolefinic resin is preferably within 50% by weight based on the entire amount of the linear low density polyethylene and the branched low density polyethylene.

The polyolefinic resin used in this invention may be the resin prepared by using a multi-side catalyst such as Ziegler catalyst or may be the resin manufactured by using single site catalyst such as metallocene catalyst.

Commercial products of the linear low density polyethylene used in this invention can include, for example, Ultzex UZ2021L, Ultzex UZ2520F, Evolue SP1540 and Evolue SP2040 (trade name of products manufactured by Mitsui Chemical Co.) can be mentioned. The commercial products of the branched low density polyethylene can include, Mirason F967, Mirason 102 (trade name of products manufactured by Mitsui Chemical Co.) and J-REX LD-L211 (trade name of products manufactured by Nippon Polyolefin Co.)

The inorganic filler used in this invention can include, for example, calcium carbonate, barium sulfate, calcium sulfate, barium carbonate, magnesium hydroxide, aluminum hydroxide, zinc oxide, magnesium oxide, titanium oxide, silica and talc. Among them, calcium carbonate and barium sulfate are preferred. The average grain size of the inorganic filler is preferably 20 μm or less. It is further preferably 10 μm or less, those of 0.5 to 5 μm size being most preferred. Further, the inorganic filler applied with surface treatment for improving the dispersibility with the polyolefinic resin is preferred. As the surface treatment agent, those capable of covering the surface of the inorganic filler to make the surface hydrophobic are preferred. For example, higher fatty acids such as stearic acid or lauric acid or metal salts thereof can be mentioned.

The compositional ratio between the polyolefinic resin and the inorganic filler is from 25 to 55% by weight of the polyolefinic resin and from 75 to 45% by weight of the inorganic filler. As a preferred range, the polyolefinic resin is from 30 to 50% by weight and the inorganic filler is from 70 to 50% by weight. When the content of the inorganic filler is less than 45% by weight, it is difficult to communicate to each other adjacent voids formed by peeling at the interface between the polyolefinic resin and the inorganic filler. Further, if the content of the filler exceeds 75% by weight, the elongation of the film upon stretching is insufficient making the stretching difficult.

The porous film according to this invention is manufactured by stretching, at lest in machine direction, a film molded from a composition containing 25 to 55% by weight of a polyolefinic resin and 75 to 45% by weight of an inorganic filler. It has a feature in adding 0.5 to 5 parts by weight of liquid ethylene-α-olefin oligomer based on 100 parts by weight of the composition.

The liquid ethylene-α-olefin oligomer is formed by copolymerizing ethylene and α-olefin. A liquid ethylene-α-olefin oligomer having a kinetic viscosity at 40° C. (JIS K-2283) of 50 to 100,000 mm$^2$/sec is preferred.

Further, ethylene-α-olefin copolymer introduced with polar groups such as a maleic acid group and modified with acid is also used. Examples of commercial products can include Lucant HC150, HC600 and A5515 (trade name of products manufactured by Mitsui Chemical Co.).

The addition amount of the liquid ethylene-α-olefin oligomer gives an effect on the dispersibility between the polyolefin resin and the inorganic filler, the film moldability, stretchability and flexibility. If the addition amount of the ethylene-α-olefin oligomer is insufficient, no satisfactory dispersibility between the polyolefin resin and the inorganic filler can be obtained to lack in the flexibility in the obtained film and it is difficult to obtain a uniformly stretched film. On the contrary, if the addition amount is excessive, the air permeability is worsened. In view of the foregoings, the above-mentioned range is preferred for the addition amount of the liquid ethylene-α-olefin oligomer.

In this invention, other additives employed for usual resin compositions may be blended. Such additives can include, for example, anti-oxidants, heat stabilizers, light stabilizers, UV-ray absorbents, neutralizing agents, lubricants, anti-clouding agents, anti-blocking agents, anti-statics, slipping agents and colorants.

The porous film according to this invention is manufactured by the following method. After mixing the polyolefinic resin with inorganic fillers and liquid ethylene-α-olefin oligomer and, optionally, other additives, they are mixed by using a mixer such as a Henschel mixer, super mixer or tumbler type mixer, kneaded by an ordinary single axis or double axis screw extruder into pellets. Then, the pellets are melted and formed into films at a temperature of at least the melting point of the polyolefin resin, and preferably a temperature of at least +20° C. higher than the melting point of the polyolefin resin but lower than the decomposition temperature thereof, by using known molding machines such as an extrusion molding machine equipped with a T-die and an inflation molding machine equipped with a circular die. Depending on the case, the composition can be directly formed into a film by a molding machine without by way of pellets.

The thus formed film is subjected to stretching within a temperature range from the room temperature to the softening point of the resin (value measured by the method according to JIS K-6760) at least in the machine direction by at least 1.2 times. Stretching may be applied in one stage or divisionally in multi-stages. If the stretching factor is less than 1.2 times, the moisture permeability of the porous film is lowered to worsen the moisture permeation. It may be biaxially stretched both in the machine direction (longitudinal direction) and a direction perpendicular thereto (traverse direction). In view of the film breakage upon stretching, the upper limit for the stretching factor is about ten times.

Main characteristics of the porous film according to this invention manufactured as described above are as shown below.

Moisture Permeability:

1500 to 4000 g/m$^2$·24 hr. Thickness: 10–300 μm. Uniformness of thickness: 0.15 or less. Ratio ($S_T/T_H$) of rigidity ($S_T$:mm) to thickness ($T_H$:μm): 1.3 to 2.2. Ratio ($T_S/T_H$) of exudation start time ($T_S$:min) relative to the thickness ($T_H$: μm): at least 0.2. Ratio ($T_E/T_H$) of exudation end time ($T_E$:min) relative to the thickness ($T_H$:μm): at least 0.4.

EXAMPLE

Examples are shown below for explaining this invention further concretely. This invention is not restricted to such examples. The moisture permeability, the exudation start time and end time of the aqueous solution of the surfactant, the rigidity and the uniformness of the film thickness are values measured by the following methods.

(1) Moisture Permeability (g/m$^2$·24 hr)

Ten sheets of specimens (10 cm×10 cm) were sampled from the porous film of 40 μm thickness, measured according to the method specified in ASTM E-96 under the conditions at a temperature of 40° C., a relative humidity of 60% and using a purified water method, and an average value thereof is calculated. The measuring time is 24 hours. The distance between the specimen and the water surface at the initial stage of measurement is 8 mm.

(2) Exudation Start Time (min) and End Time (min) for the Aqueous Solution of Surfactant.

A specimen of the porous film of 25 μm thickness is provided. A surfactant solution (an aqueous solution of 0.005% by weight of Rikemal B-207; trade name of products manufactured by Riken Vitamin Co.) is used as an exudation promoting solution. The specimen film is placed on a glass plate and a ring of 5 cm diameter and 3 cm height is placed thereon. The solution described above was dropped by 10 ml to a specimen into the ring by using a syringe and the state of exudation to the glass plate is observed below the glass plate. The exudation start time is defined as the instance when an opaque pin point portion of about 0.5 mm diameter appears within the circle of 5 cm diameter, and the exudation end time is defined as the instance when the opaque portion prevails over the entire surface of the circle of 5 cm diameter. Both for the exudation start time and exudation end time, a specimen improved with the exudation property shows longer value. The test is conducted at room temperature of 25° C.

(3) Rigidity (mm)

The rigidity is measured in accordance with the method specified in JIS L-1096 (cantilever method). <Preparation of Specimen> The film of 200 mm width, 300 mm length and 40 μm thickness was wound around a carpenter's square of 25 mm width and then the square is drawn away. The thus obtained flat wound product (25 mm width and 300 mm length) is pressed by a roller of 1 kg weight by one reciprocation stroke to prepare a specimen.

(4) Uniformness of Film Thickness

Three sheets of specimens are sampled from the porous film of 40 μm thickness [101 cm in machine direction, 5 cm in a direction perpendicular to the machine direction] are sampled from the porous film of 40 μm thickness and the thickness is measured at 300 measuring points in total each at a longitudinal 1 cm distance or interval, by using a thickness measuring gauge (UPRIGHT DIAL GAUGE No. 25, manufactured by PEACOCK Co.) to calculate an average thickness (X), maximum thickness (MAX) and minimum thickness (MIN) are determined to calculate [(MAX)–(MIN)]/(X) which is defined as the uniformness of the film thickness.

Example 1

After mixing 38 parts by weight of linear low density polyethylene (Ultzex UZ2021L, trade name of products manufactured by Mitsui Chemical Co.) (95 wt % in polyolefinic resin), 2 parts by weight of branched low density polyethylene (Mirason F967, trade name of products manufactured by Mitsui Chemical Co.) (5 wt % in polyolefinic resin), 60 parts by weight of calcium carbonate (SST-40, trade name of products manufactured by Dowa CALFINE Co.), and 2 parts by weight of Lucant HC600 (kinetic viscosity; 9850 mm$^2$/sec, manufactured by Mitsui Chemical Co.) as the ethylene-α-olefin oligomer in a tumbler mixer, they were uniformly kneaded at 230° C. by using a tandem type kneading extruder, and fabricated into pellets. After melting the pellets and forming them into a film at 240° C. using an extrusion molding machine equipped with a T-die, the film was monoaxially stretched in the machine direction between a preheat roll and a stretching roll heated to 70° C. by the stretching factor of 2.0 times and at the line speed of 200 m/min to obtain porous films of 25 μm and 40 μm thickness. Each of the characteristics of the thus obtained porous films was measured by the method described above. The blending ratio of the starting material is shown in [Table 1] and the obtained results are shown in [Table 2].

Example 2

A porous film was obtained in the same procedures as those in Example 1 except for replacing Lucant HC600 used in Example 1 with Lucant HC150 (manufactured by Mitsui Chemical Co., kinetic viscosity: 2200 mm$^2$/sec). The blending ratio of the starting material is shown in [Table 1] and the obtained results are shown in [Table 2].

TABLE 1

|  | LL (parts by weight) | Branched LD (parts by weight) | CaCO$_3$ (parts by weight) | Oligomer (parts by weight) |
|---|---|---|---|---|
| Example 1 | A:38 | C:2 | 60 | E:2 |
| Example 2 | A:38 | C:2 | 60 | F:2 |
| Example 3 | B:38 | C:2 | 60 | E:2 |
| Example 4 | A:38 | C:2 | 60 | G:2 |
| Example 5 | A:38 | C:2 | 60 | E:1 |
| Example 6 | A:38 | C:2 | 60 | E:4 |
| Example 7 | A:32 | D:8 | 60 | E:2 |
| Comp. Example 1 | A:38 | C:2 | 60 | H:2 |
| Comp. Example 2 | A:38 | C:2 | 60 | E:0.2 |
| Comp. Example 3 | A:38 | C:2 | 60 | E:8 |
| Comp. Example 4 | A:38 | C:2 | 60 | — |
| Comp. Example 5 | A:38 | C:2 | 60 | I:2 |
| Comp. Example 6 | A:38 | C:2 | 60 | J:2 |
| Comp. Example 7 | A:24 | D:16 | 60 | E:2 |
| Comp. Example 8 | A:40 | — | 60 | E:2 |
| Comp. Example 9 | A:40 | — | 60 | E:2 H:3 |

LL: linear low density polyethylene
Branched LD: branched low density polyethylene
Oligomer: ethylene-α-olefin oligomer
A: Ultzex UZ2021L, trade name of products manufactured by Mitsui Chemical Co.
B: Evolue SP1540, trade name of products manufactured by Mitsui Chemical Co.
C: Mirason F967, trade name of products manufactured by Mitsui Chemical Co.
D: J-REX LD-L211, commercial name of products manufactured by Nippon Polyolefin Co.
E: Lucant HC600, trade name of products manufactured by Mitsui Chemical Co.
F: Lucant HC150, trade name of products manufactured by Mitsui Chemical Co.
G: Lucant A5515, trade name of products manufactured by Mitsui Chemical Co.
H: Purified castor oil, trade name of products manufactured by Ito Seiyu Co.
I: Hiwax 210P, trade name of products manufactured by Mitsui Chemical Co.
J: liquid paraffin, manufactured by Katayama Chemical Co.

LL: linear low density polyethylene
Branched LD: branched low density polyethylene
Oligomer: ethylene-α-olefin
A: Ultzex uz2021L, trade name of products manufactured by Mitsui Chemical Co.

H: Purified castor oil, trade name of products manufactured by Ito Seiyu Co.
I: Hiwax 210P, trade name of products manufactured by Mitsui Chemical Co.
J: liquid paraffin, manufactured by Katayama Chemical Co.

TABLE 2

|  | Moisture permeability (g/m$^2$ · 24 hr) | $T_S$ (min) | $T_E$ (min) | $T_S/T_H$ (min/μm) | $T_E/T_H$ (min/μm) | Rigidity (mm) | $S_T/T_H$ (mm/μm) | Uniformness of thickness | Overall evaluation |
|---|---|---|---|---|---|---|---|---|---|
| Example 1 | 2400 | 22 | 41 | 0.88 | 1.64 | 71 | 1.8 | 0.07 | ◯ |
| Example 2 | 2600 | 20 | 35 | 0.80 | 1.40 | 69 | 1.7 | 0.08 | ◯ |
| Example 3 | 2200 | 18 | 37 | 0.72 | 1.48 | 70 | 1.8 | 0.10 | ◯ |
| Example 4 | 2500 | 17 | 32 | 0.68 | 1.28 | 73 | 1.8 | 0.09 | ◯ |
| Example 5 | 2500 | 24 | 45 | 0.96 | 1.80 | 75 | 1.9 | 0.10 | ◯ |
| Example 6 | 2200 | 23 | 44 | 0.92 | 1.76 | 66 | 1.7 | 0.07 | ◯ |
| Example 7 | 2000 | 13 | 20 | 0.52 | 0.80 | 64 | 1.6 | 0.06 | ◯ |

$T_S$: Exudation start time
$T_E$: Exudation end time
$T_H$: Film thickness
$S_T$: Rigidity E: Evolue SP1540, trade name of products manufactured by Mitsui Chemical Co.
Mirason F967, trade name of products manufactured by Mitsui Chemical Co.
J-REX LD-L211, commercial name of products manufactured by Nippon Polyolefin Co.
E: Lucant HC600, trade name of products manufactured by Mitsui Chemical Co.
F: Lucant HC150, trade name of products manufactured by Mitsui Chemical Co.
G: Lucant A5515, trade name of products manufactured by Mitsui Chemical Co.

Example 3

A porous film was obtained in the same procedures as those in Example 1 except for replacing the polyolefinic resin in Example 1 with 38 parts by weight of linear low density polyethylene (Evolue SP1540, trade name of products manufactured by Mitsui Chemical Co.) (95 wt % in the polyolefinic resin) and 2 parts by weight of a branched low density polyethylene (Mirason F967, trade name of products manufactured by Mitsui Chemical Co.) (5 wt % in the polyolefinic resin). The blending ratio of the starting materials is shown in [Table 1] and the obtained results are shown in [Table 2].

Example 4

A porous film was obtained in the same procedures as those in Example 1 except for replacing Lucant HC600 used in Example 1 with Lucant A5515 (manufactured by Mitsui Chemical Co. Kinetic viscosity; 14600 mm$^2$/sec). The blending ratio of the starting materials is shown in [Table 1] and the obtained results are shown in [Table 2].

Example 5

A porous film was obtained in the same procedures as those in Example 1 except for changing the addition amount of Lucant HC600 in Example 1 to 1 part by weight. The blending ratio of the starting materials is shown in [Table 1] and the obtained results are shown in [Table 2].

Example 6

A porous film was obtained in the same procedures as those in Example 1 except for changing the addition amount of Lucant HC600 in Example 1 to 4 part by weight. The blending ratio of the starting materials is shown in [Table 1] and the obtained results are shown in [Table 2].

Example 7

A porous film was obtained in the same procedures as those in Example 1 except for replacing the polyolefinic resin in Example 1 with 32 parts by weight of linear low density polyethylene (Ultzex UZ2021L, trade name of products manufactured by Mitsui Chemical Co.) (80 wt % in the polyolefinic resin), 8 parts by weight of a branched low density polyethylene (J-REX LD L211, trade name of products manufactured by Nippon Polyolef in Co.) (20 wt % in the polyolefinic resin). The blending ratio of the starting materials is shown in [Table 1] and the obtained results are shown in [Table 2].

Comparative Example 1

A porous film was obtained in the same procedures as those in Example 1 except for replacing Lucant HC600 used in Example 1 with castor oil (purified castor oil, trade name of products manufactured by Ito Seiyu Co.). The blending ratio of the starting materials is shown in [Table 1] and the obtained results are shown in [Table 3].

Comparative Example 2

A porous film was obtained in the same procedures as those in Example 1 except for changing the addition amount of Lucant HC600 in Example 1 to 0.2 part by weight. The blending ratio of the starting materials is shown in [Table 1] and the obtained results are shown in [Table 3].

Comparative Example 3

A porous film was obtained in the same procedures as those in Example 1 except for changing the addition amount of Lucant HC600 in Example 1 to 8 part by weight. The blending ratio of the starting materials is shown in [Table 1] and the obtained results are shown in [Table 3].

Comparative Example 4

A porous film was obtained in the same procedures as those in Example 1 except for not adding Lucant HC600. The blending ratio of the starting materials is shown in [Table 1] and the obtained results are shown in [Table 3].

Comparative Example 5

A porous film was obtained in the same procedures as those in Example 1 except for replacing Lucant HC600 used in Example 1 with PE wax (High wax 210P, trade name of products manufactured by Mitsui Chemical Co.). The blending ratio of the starting materials is shown in [Table 1] and the obtained results are shown in [Table 3].

TABLE 3

| | Moisture permeability (g/m$^2$ · 24 hr) | $T_S$ (min) | $T_E$ (min) | $T_S/T_H$ (min/μm) | $T_E/T_H$ (min/μm) | Rigidity (mm) | $S_T/T_H$ (mm/μm) | Uniformness of thickness | Overall evaluation |
|---|---|---|---|---|---|---|---|---|---|
| Comp. Example 1 | 2400 | 4 | 8 | 0.16 | 0.32 | 72 | 1.8 | 0.09 | X |
| Comp. Example 2 | 2600 | 25 | 47 | 1.0 | 1.9 | 90 | 2.3 | 0.16 | X |
| Comp. Example 3 | 1400 | 15 | 30 | 0.60 | 1.2 | 60 | 1.5 | 0.08 | X |
| Comp. Example 4 | 2600 | 27 | 53 | 1.1 | 2.1 | 99 | 2.5 | 0.18 | X |
| Comp. Example 5 | 2400 | 23 | 43 | 0.92 | 1.7 | 93 | 2.3 | 0.17 | X |
| Comp. Example 6 | 2300 | 19 | 40 | 0.76 | 1.6 | 71 | 1.8 | 0.16 | X |
| Comp. Example 7 | | | | | | | | | X |
| Comp. Example 8 | 2200 | 19 | 39 | 0.76 | 1.6 | 70 | 1.8 | 0.20 | X |
| Comp. Example 9 | 2000 | 3 | 7 | 0.12 | 0.28 | 64 | 1.6 | 0.10 | X |

$T_S$: Exudation start time
$T_E$: Exudation end time
$T_H$: Film thickness
$S_T$: Rigidity Comparative Example 6

A porous film was obtained in the same procedures as those in Example 1 except for replacing Lucant HC600 used in Example 1 with liquid paraffin (manufactured by Katayama Chemical Co.). The blending ratio of the starting materials is shown in [Table 1] and the obtained results are shown in [Table 3].

Comparative Example 7

A porous film was obtained in the same procedures as those in Example 1 except for replacing the polyolefinic resin in Example 1 with 24 parts by weight of linear low density polyethylene (Ultzex UZ2021L, trade name of products manufactured by Mitsui Chemical Co.) (60 wt % in the polyolefinic resin), 16 parts by weight of branched low density polyethylene (J-REX LD L211, trade name of products manufactured by Nippon Polyolefin Co.) (40 wt % in the polyolefinic resin). The blending ratio of the starting materials is shown in [Table 1] and the obtained results are shown in [Table 3].

Comparative Example 8

A porous film was obtained in the same procedures as those in Example 1 except for replacing the polyolefinic resin in Example 1 with 40 parts by weight of linear low density polyethylene (Ultzex UZ2021L, trade name of products manufactured by Mitsui Chemical Co.) (100 wt % in the polyolefinic resin). The blending ratio of the starting materials is shown in [Table 1] and the obtained results are shown in [Table 3].

Comparative Example 9

A porous film was obtained in the same procedures as those in Example 1 except for adding 3 parts by weight of castor oil to the composition in Example 1. The blending ratio of the starting materials is shown in [Table 1] and the obtained results are shown in [Table 3].

What is claimed is:

1. A porous film molded from a composition comprising 25 to 55% by weight of polyolefinic resin and 75 to 45% by weight of inorganic filler, in which the polyolefinic resin comprises 98 to 70% by weight of linear low density polyethylene and 2 to 30% by weight of branched low density polyethylene, and wherein the composition further comprises 0.5 to 5 parts by weight of liquid ethylene-α-olefin oligomer based on 100 parts by weight of the composition, the porous film having a moisture permeability from 1500 to 4000 g/m²·24 hr. and a uniformness of thickness of 0.15 or less.

2. A porous film as defined in claim 1, wherein the kinetic viscosity at 40° C. of the ethylene-α-olefin oligomer is from 50 to 100000 m²/sec.

3. A porous film as defined in claim 1, wherein the ratio ($S_T/T_H$) of the rigidity ($S_T$:mm) relative to the thickness of the porous film ($T_H$:μm) is from 1.3 to 2.2.

4. A porous film as defined in claim 1, wherein the ratio ($T_S/T_H$) of the exudation start time ($T_S$:min) relative to the thickness of the porous film ($T_H$:μm) is at least 0.2 and the ratio $T_E/T_H$) of exudation end time ($T_E$:min) relative to the thickness ($T_H$:μm) is at least 0.4.

5. A porous film as defined in claim 1, wherein the thickness of the porous film is from 10 to 300 μm.

6. A method of manufacturing a porous film as defined in claim 1 which comprises molding a film from composition containing 25 to 55% by weight of polyolefinic resin and 75 to 45% by weight of inorganic filler, and stretching the thus obtained film at least in the machine direction, which comprises using resin containing from 98 to 70% by weight of linear low density polyethylene and from 2 to 30% by weight of branched low density polyethylene as the polyolefinic resin, adding from 0.5 to 5 parts by weight of liquid ethylene-α-olefin oligomer based on 100 parts by weight of the composition and taking up the film while stretching at line speed at least of 100 m/min upon stretching in the machine direction.

7. A manufacturing method of a porous film as defined in claim 6, wherein the stretching factor at least in the machine direction is at least 1.2 times.

* * * * *